United States Patent
Cudak et al.

(10) Patent No.: US 8,537,790 B2
(45) Date of Patent: Sep. 17, 2013

(54) HIERARCHICAL PILOT STRUCTURE IN WIRELESS COMMUNICATION SYSTEMS

(75) Inventors: Mark C. Cudak, Rolling Meadows, IL (US); Timothy A. Thomas, Palatine, IL (US); Frederick W. Vook, Schaumburg, IL (US); Anup K. Talukdar, Dekalb, IL (US); Fan Wang, Chicago, IL (US); Bishwarup Mondal, Schaumburg, IL (US)

(73) Assignee: Motorola Mobility LLC, Libertyville, IL (US)

( * ) Notice: Subject to any disclaimer, the term of this patent is extended or adjusted under 35 U.S.C. 154(b) by 686 days.

(21) Appl. No.: 12/367,483

(22) Filed: Feb. 6, 2009

(65) Prior Publication Data

US 2009/0225722 A1    Sep. 10, 2009

Related U.S. Application Data

(60) Provisional application No. 61/035,322, filed on Mar. 10, 2008.

(51) Int. Cl.
*H04W 4/00* (2009.01)

(52) U.S. Cl.
USPC .......................................................... 370/337

(58) Field of Classification Search
USPC ................................. 370/337, 320
See application file for complete search history.

(56) References Cited

U.S. PATENT DOCUMENTS

| | | | |
|---|---|---|---|
| 2007/0070944 A1* | 3/2007 | Rinne et al. | 370/329 |
| 2007/0097897 A1 | 5/2007 | Teague et al. | |
| 2007/0189240 A1* | 8/2007 | Cho et al. | 370/337 |
| 2008/0130570 A1 | 6/2008 | Jung et al. | |
| 2009/0213802 A1 | 8/2009 | Miki et al. | |
| 2009/0225721 A1 | 9/2009 | Cudak et al. | |
| 2010/0150106 A1 | 6/2010 | Barriac | |
| 2011/0075625 A1* | 3/2011 | Nystrom et al. | 370/329 |

FOREIGN PATENT DOCUMENTS

| | | |
|---|---|---|
| EP | 1811734 A1 | 7/2007 |
| WO | 2007148610 A1 | 12/2007 |

OTHER PUBLICATIONS

Patent Cooperation Treaty, "PCT Search Report and Written Opinion of the International Searching Authority" for International Application No. PCT/US2009/036130 (CML07056) Jul. 30, 2009, 14 pages.
CS36611; PCT/US2009/036144; PCT Search Report and Written Opinion; Jul. 30, 2009.
IEEE C802.16m-07/010; Rate Matching in 802.16m; Blankenship et al.; 4 Pages; Jan. 16, 2008.
IEEE C802.16m-08/014; MIMO Considerations for the Downlink Subchannel and Polot Format Design in IEEE802.16m; Vook et al.; 18 Pages; Jan. 16, 2008.
IEEE C802.16m-07/196r1; Resource Tile Size in IEEE 802.16m Medium Access Control Frame Structure; Talukdar et al.; 8 Pages; Mar. 10, 2008.
IEEE C802.16m-08/090r2; Basic Resource Block and Pilot Allocation Design in IEEE 802.16m; Choi et al; 16 Pages; Jan. 16, 2008.
IEEE C802.16m-08/008; Proposed Frame Structure for IEEE 802.16m; Cudak et al.; 14 Pages; Jan. 16, 2008.
United States Patent and Treademark Office, "Final Rejection" for U.S. Appl. No. 12/367,473 (CML07056) Dec. 1, 2011, 13 pages.
Japanese Patent Office, Office Action for Japanese Patent Application No. 2010-548943, dated Jun. 2, 2012, 2 pages.

* cited by examiner

*Primary Examiner* — Albert T Chou

(57) ABSTRACT

A method for communicating control channel information in a wireless communication system, including transmitting a super-frame having a time-frequency resource region containing an allocation control channel and multiple pilot elements, at least some of which are associated with the allocation control channel, and indicating, in a configuration information control channel of the super-frame, a characteristic of the pilots elements associated with the allocation control channel.

28 Claims, 12 Drawing Sheets

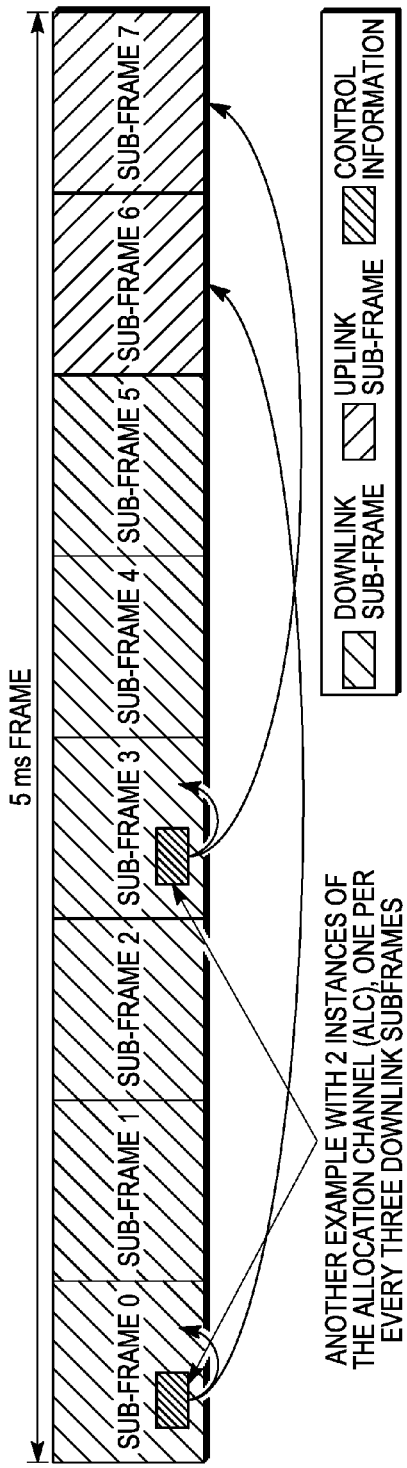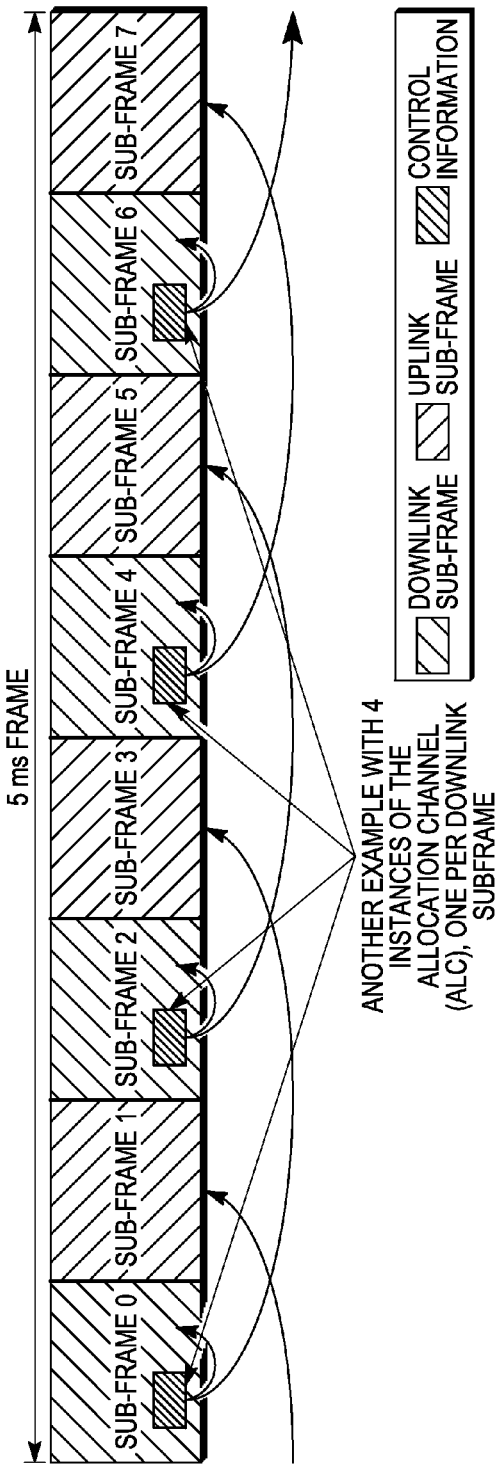

EXAMPLE HOW A FOUR 2-9X3
ALLOCATION CHANNELS OF
LENGTH 48 SUBCARRIERS AND 6
PILOT ELEMENTS FIT WITHIN
TWO 18X6 RESOURCE BLOCKS $A_n$ = ALLOCATION CHANNEL
SUBCARRIER FOR MOBILE n $D_n$ = DEDICATED PILOT ELEMENT
FOR MOBILE n

*FIG. 11*

HIERARCHICAL PILOT STRUCTURE IN WIRELESS COMMUNICATION SYSTEMS

FIELD OF THE DISCLOSURE

The present disclosure relates generally to wireless communications and more particularly to a method of environmentally adapting a wireless communication system by means of a hierarchical pilot structure.

BACKGROUND

Cellular networks are deployed in a variety of environments including less populated rural areas, moderately populated suburban areas, and densely populated urban areas. The characteristics of wireless channels tend to change from one environment to another. When a cellular base station employs an array of antennas, it can be constructed to use one or more of a variety of smart antenna techniques. The performance of smart antenna techniques is known to be dependent on a many factors, such as the array configuration (e.g., the number, relative location, polarization of the antennas of the array), the location of the base station with respect to surrounding scatterers (e.g., above or below), the distribution of scatterers in the environment, and the velocity of the mobile station (MS), which may also be interchangeably referred to as a "mobile," "wireless communication terminal" user equipment (UE), and "terminal" among other terms. The number of scatterers, the angular spread of the channel, the Doppler spread, and the delay spread of the channel along with the base station array type also impact system performance.

The array configuration (e.g., spacing and polarization) of the base station and the smart antenna transmission strategy is generally optimized by cellular network designers for a particular environment. For example, if there is a relatively low angular spread in the channel, then a deployment of a uniform linear array with a low spacing (e.g., half lambda) may be a good choice since this type of array is better at steering a beam that encompasses most if not all scatterers resulting in the mobile station receiving a boosted signal even if the mobile station is moving at high speeds. Therefore, for rural or suburban channels having these characteristics, base stations could be deployed with uniform linear arrays to support beam-forming. In another example, if the angular spread is large then beam steering is less important since the beam would likely not encompass all of the rays. Under these circumstances it may be more important to increase the system capacity through MIMO techniques. In this case an array with wider spaced elements and possibly different polarizations is typically desired. Therefore, in urban scenarios, the base stations could be deployed with arrays of widely spaced cross polarized elements to support MIMO transmission. It is apparent that the base stations used to serve a geographic region do not necessarily employ the same array configuration or the same smart antenna transmission strategy. In a geographic area in which portions can be classified as rural and other portions as suburban, then the base stations in the urban locations could be deployed with two antennas for supporting open-loop MIMO transmission/open-loop spatial multiplexing, while the base stations in the suburban locations could be deployed with eight antennas for supporting closed-loop beam-forming.

The various smart antenna transmission strategies require specific optimizations within the signaling and physical layer formats to achieve optimum performance. A first example is the type of transmission used for the control, reference symbols (pilots) and/or data channels. The type of transmission might, for example, be dedicated to a particular mobile station because, for example, it is a beam-formed transmission, the transmission is power controlled etc. On the other hand, the transmission might be for more than one mobile station in which case the data or control is said to be broadcast. A broadcast strategy may be more suitable for antenna configurations having a small number of elements such as only one or two. In either case, the receiver of the transmission (e.g., mobile station in the case of a downlink transmission) will need to have pilot symbols in order to be able to obtain a channel estimate, which is then used to detect the data or control transmission. In the case of dedicated transmission, the pilots may be dedicated (e.g., beam-formed with the transmission) or be broadcast if the receiver (e.g., mobile station) knows or is informed of the beam-forming weights. For broadcast transmission, the pilots also tend to be broadcast where, for example, a separate pilot sequence is sent from each transmit antenna enabling the receiver to estimate the channel between each receive antenna and each transmit antenna. Dedicated transmission may still be used for a transmission to a single mobile station even if the pilot type is broadcast. In this case, knowledge of the broadcast channel between the transmit and receive antennas as well as the beam-forming weights enables the receiver (e.g., mobile station) to determine the beam-formed channel, which is then used to detect the data or control transmission.

In prior art cellular communications, the array type may change from cell to cell according to operator deployment choices and other factors, but unfortunately other mentioned system configurations such as the data and control channel format are fixed for all environments. Fixing the type of data or control transmission for all types of environments results in lower system capacity or available range in one environment over the other. Ideally, the type of data or control transmission could be tailored to the base station configuration with its associated smart antenna strategy that are both optimized for the particular environment.

Unfortunately, a heterogeneous deployment comprising of a variety of base station configurations poses further challenges. For example, a typical mobile station roaming from one environment to the next—be it rural, suburban, dense urban, or indoor—will receive service from the base stations having a variety of configurations. This mobile station would need to detect the base station configuration including data and pilot formats. Thus there is a need for a mechanism that enables communicating the type of data or control transmission as well as the type of pilot format depending on the environment and/or the deployment of a particular base station.

The various aspects, features and advantages of the disclosure will become more fully apparent to those having ordinary skill in the art upon a careful consideration of the following Detailed Description thereof with the accompanying drawings described below. The drawings may have been simplified for clarity and are not necessarily drawn to scale.

BRIEF DESCRIPTION OF THE DRAWINGS

FIG. 11 illustrates how allocation channels may fit within two resource blocks.

DETAILED DESCRIPTION

Figure 1:
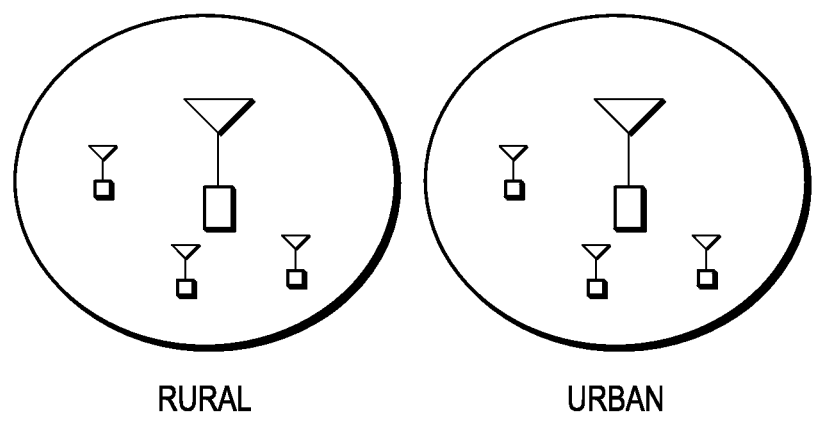
FIG. 1 is a wireless communication system serving different environments.

In a rural environment, it may be desirable to deploy a half-wave-spaced linear array and use beam-forming for data transmissions. With control that is dedicated to a particular user (instead of broadcast for all users to decode), it would be advantageous to power control and beam-form the dedicated control messages, wherein the beam-forming is enabled by leveraging uplink channel response reciprocity in TDD or multipath direction of arrival reciprocity in FDD. For these methods of performing beam-forming for both TDD and FDD systems, the beam-formed transmission requires pilot symbols that are beam-formed along with the control message. Now consider an urban environment in which the multipath angular spread is large and the antenna array is comprised of cross polarized or widely spaced linear antenna elements for the intent of creating de-correlated transmit antennas. Such a configuration is a poor choice for beam-forming but is a good choice for MIMO transmission. In this scenario, it may not make sense to beam-form the control channel given that transmit diversity (Space-Time Coding) may be preferred over beam-forming. An STC or transmit diversity method may require a different pilot signaling methodology than a beam-forming method. As a result, for optimal control channel efficiency, there is a need to enable the use of different control channel and pilot formats depending on the smart antenna technique used to transmit the control channel.

The present disclosure provides communication signaling strategies that enables the efficient specification of the control channel format and key characteristics along with the data channel format and characteristics in Orthogonal Frequency Division Multiplexing (OFDM) or orthogonal Frequency Division Multiple Access (OFDMA) wireless communication system. OFDM is a popular link method for cellular communications because of its simple equalization and flexibility to schedule transmissions to different users in both frequency and time. In OFDM systems, the transmission is divided into data streams that are transmitted simultaneously over multiple subcarriers. At a particular time (OFDM symbol), each subcarrier consists of only a single data symbol. Because each subcarrier and time is a separate symbol, the data streams (groups of data symbols) for different users may be mixed in both frequency and time.

In the downlink of a typical wireless communication system, a geographically fixed base station (base or BS) transmits data and other information such as control signaling, which provides detailed information of the structure of the communication link to one or more mobile stations. The downlink transmission is divided in time into super-frames comprising a time-frequency resource region containing many OFDM symbols, e.g., 20 milliseconds (ms) worth of symbols. The time-frequency resource region generally contains a control channel, one or more resource blocks and multiple pilot elements. In one implementation, the control channel of the time-frequency resource region is an allocation control channel as discussed further below. The pilot elements, or pilots, may be implemented as pilot sub-carriers or reference symbols.

Figure 2:
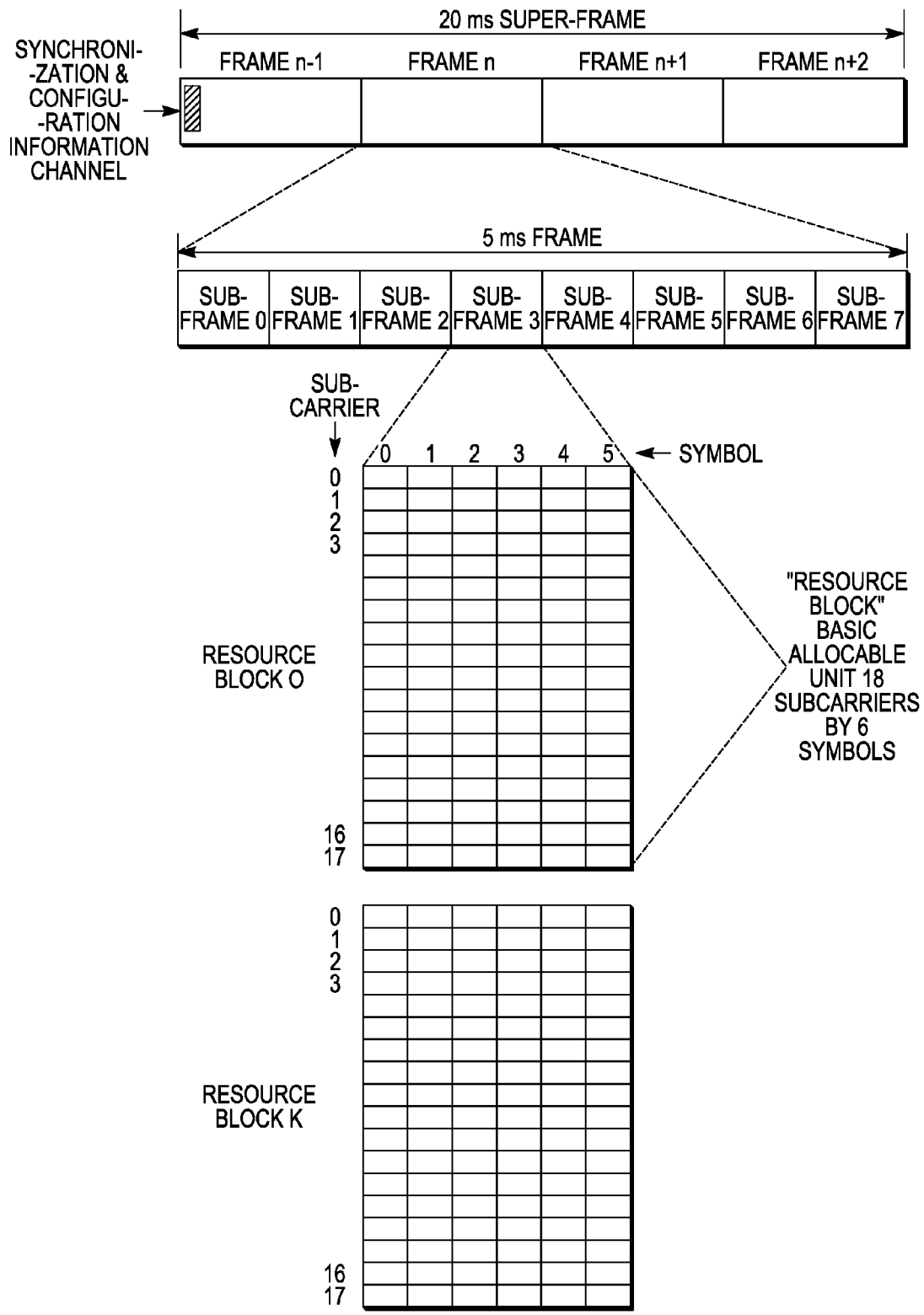
FIG. 2 is a hierarchical frame structure showing a super-frame, frame, sub-frame and resource block.

In some implementations, the time-frequency resource region is divided into multiple sub-frames, or mini-frames, which contains relatively few OFDM symbols, e.g., 0.6 ms worth of symbols. The sub-frames are broken up into transmission resources, which contain data for a particular mobile station and/or control information for one or more mobile stations. The sub-frames may be subdivided in time, frequency or both time and frequency. FIG. 2 illustrates a 20 mobile station super-frame comprising multiple sub-frames. The super-frame, and particularly the first sub-frame thereof, includes a single synchronization and information control (CIC) channel, wherein each sub-frame comprises multiple resource tiles or blocks. In FIG. 2, the basic allocable unit of the resource block is 18 sub-carriers and 6 symbols. Generally, the synchronization and CIC need not be in the first sub-frame and may be placed in any sub-frame within the super-frame provided that the mobile station knows the relative position of the synchronization and CIC, which position will typically be defined in an air-interface specification and programmed into the mobile station at time of manufacture. The control channel contains the information the mobile station needs to decode its data in the particular downlink and to get the allocation details for its uplink transmission. Typically there will be more than one control channel in a wireless communication system. In FIG. 2, the CIC is signaled once per super-frame. The CIC is typically placed adjacent to the synchronization channel, which a mobile station uses to synchronize to the system. Upon synchronizing, the mobile station can read the CIC message and determine the system configuration. The CIC would be received reliably by all mobile stations in the system and ideally uses an identical physical layer format, e.g. broadcast format, for all base station configurations.

Figure 5:
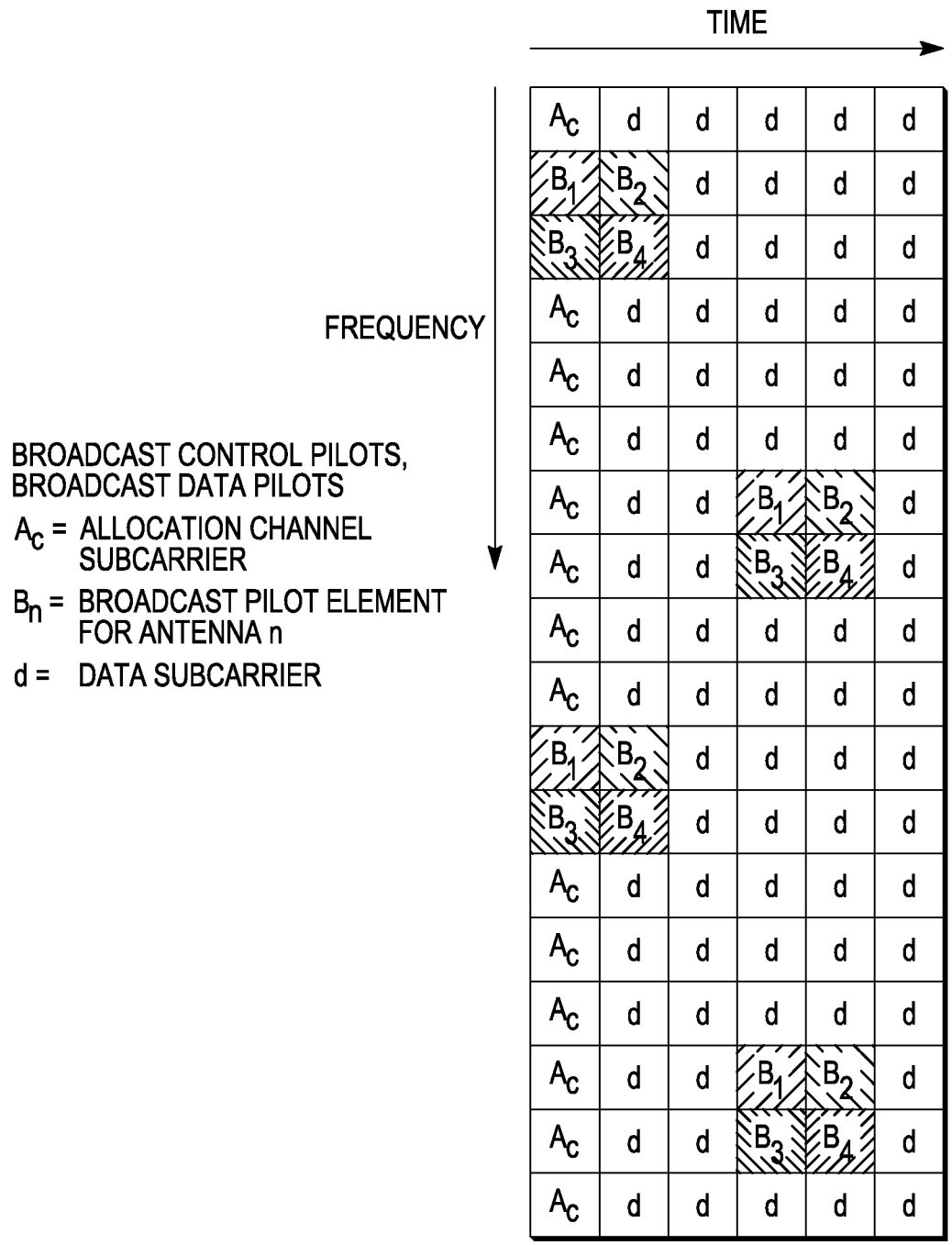
FIG. 5 illustrates a resource block containing broadcast pilots ($B_{1, 2, 3, 4,}$) for the allocation channel ($A_c$) and data (d) channel.
Figure 6:
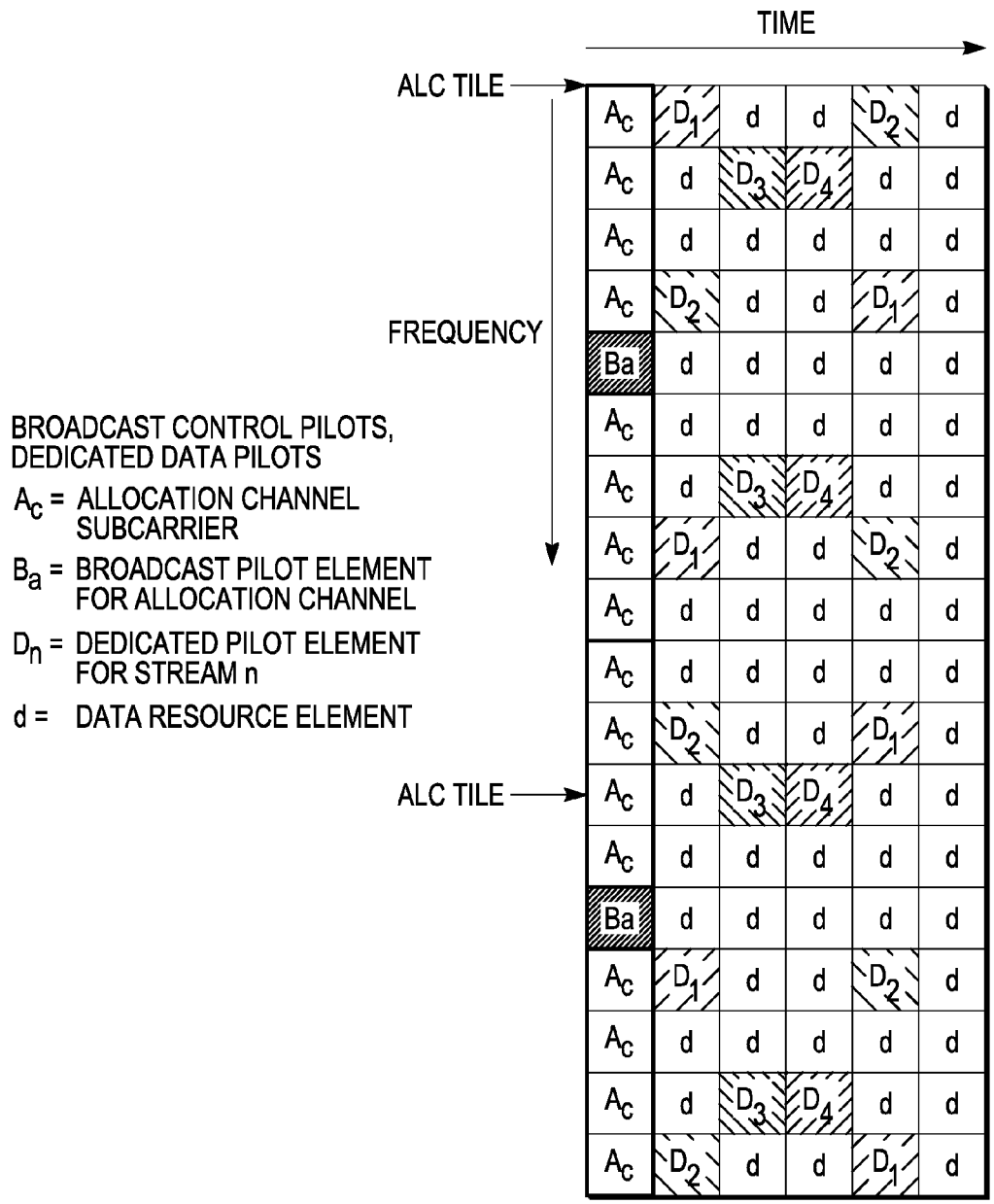
FIG. 6 illustrates a resource block containing broadcast pilots ($B_a$) for the allocation channel ($A_c$) and dedicated pilots ($D_{1, 2}$) for the data channel (d).
Figure 7:
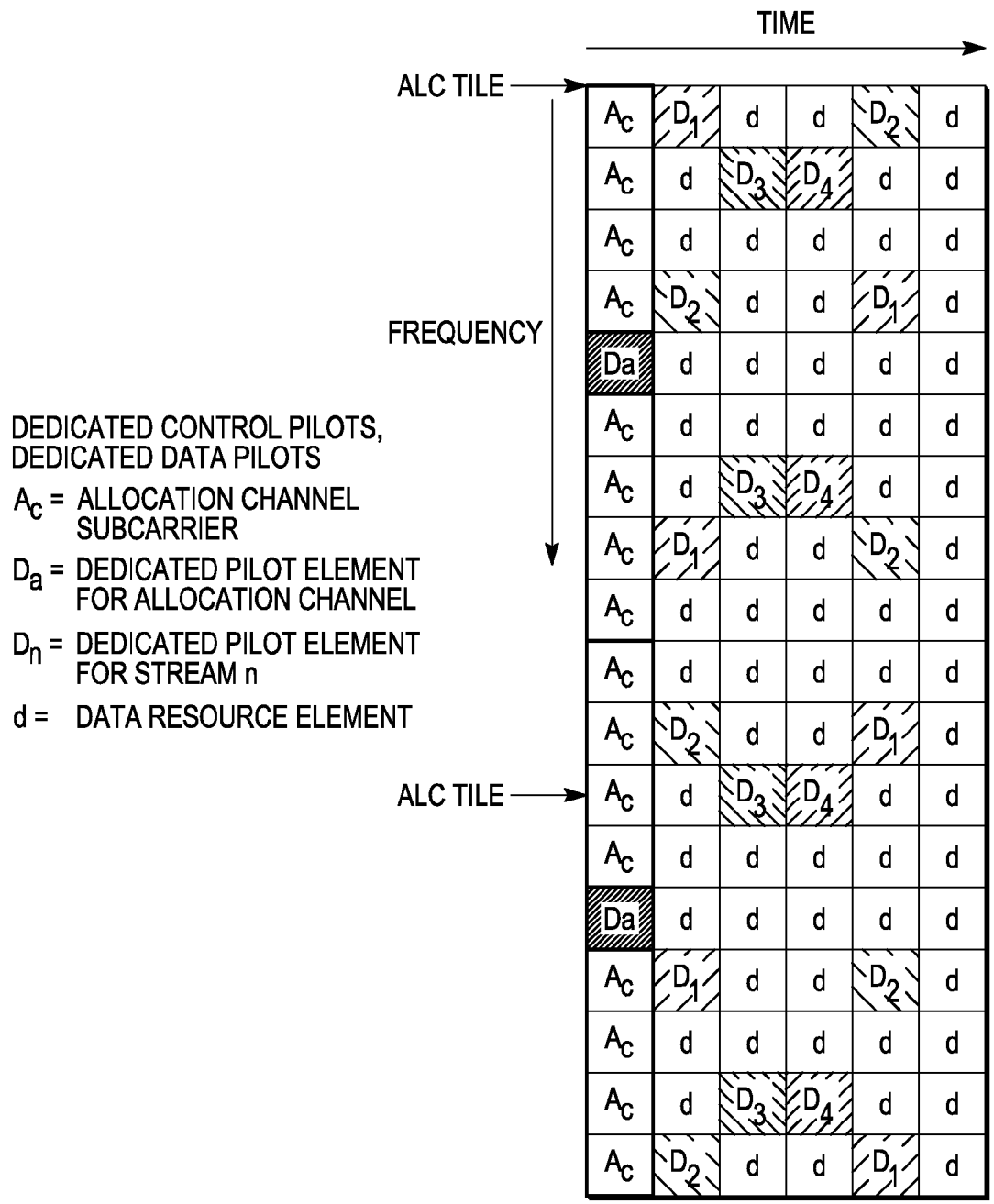
FIG. 7 illustrates a resource block containing dedicated pilots ($D_a$) for the allocation channel ($A_c$) and dedicated pilots ($D_{1, 2}$) for the data channel (d).

One type of transmission resource is the resource block (RB), which is used to transmit a portion of a data stream to a particular mobile station. A RB represents a unit of the OFDM time-frequency resource or time-frequency resource region, which may contain one or more resource elements or sub-carriers. For example, an RB may consists of 18 adjacent subcarriers (frequency bins) by 6 OFDM adjacent symbols in time as shown in FIGS. 5-7. Data for a particular mobile station is transmitted in Physical-Layer Protocol Data Units (PHY PDUs), which may be mapped onto one or more RBs. The RBs comprising a PHY PDUs may be using either a "Narrowband" (Localized) or "Broadband" (Diversity) grouping strategy. In the narrowband or localized strategy, two or more RBs are grouped together adjacent in frequency to form a PHY PDU. The term "sub-channel" may be used to mean a grouping of one or more RBs into a group that collectively transmits a PHY PDU. In the broadband or diversity strategy, groups of two or more RBs are distributed across the band to form a PHY PDU.

The RB can be modulated with various MIMO and/or other advanced antenna array transmission techniques such as single antenna transmission, aggregated multiple antenna transmission (e.g., low delay cyclic delay diversity), closed-loop single-user MIMO (SU-MIMO) including beam-forming, closed-loop multi-user MIMO (MU-MIMO), and open-loop techniques such as space-time or space-frequency block codes or open-loop MIMO, open-loop spatial multiplexing (e.g. large delay CDD). Pilot elements are typically sent along with data symbols in an RB in order for the mobile station to perform a downlink channel estimate, which is used to equalize the received RB and to recover its data and/or control information. Each of these advanced antenna array transmission techniques may require pilot elements to be transmitted in a certain way that is tailored to the specifics and constraints of that transmission method so as to enable the mobile station to properly and efficiently receive and decode the information/data being transmitted on the RB. Furthermore, given the specifics of how the pilot elements are transmitted along with the data, pilot elements from one RB may or may not be useable for channel estimation by mobile stations not assigned to receive data on that RB.

To understand how pilot elements are transmitted within the RB and how they are used by mobile station, it is helpful to classify pilot elements of an RB according to how they are transmitted within the RB ("type") and how pilots within an RB are useable by the mobile station ("usability"). Pilot "usability" also refers to whether the pilots within an RB can be used by mobile stations that are not assigned to receive data on that RB.

It is anticipated that there are at least two "types" of pilot elements. "Beam-formed" pilots are beam-formed within the RB in a manner that is tailored to the channel or locations of the mobile stations assigned to the RB. "Per-transmit-antenna" pilots are transmitted without any beam-forming and in a manner that enables the mobiles to estimate the channel from each of the transmit antennas. Also, the per-transmit-antenna pilots can be used when the control channel is pre-coded at the base-station using the pre-coding vector pre-selected and fed back by the UE.

The per-transmit-antenna pilots are generally transmitted from the transmit antennas separately from the data. This type of pilot element is typically used in open-loop techniques such as space-time or space-frequency block coding and MIMO but may also be used when the control channels are pre-coded. It is worth noting that per-transmit-antenna pilots could be sent from virtual antennas instead from actual physical antennas. An example of a virtual antenna would be the combining of two physical antennas to make the pair look like a single antenna through low delay cyclic shift diversity. However, in the case of virtual antennas, a mobile station can only use pilots in other RBs for channel estimation only if those RBs have per-transmit-antenna pilots and also the same antenna virtualization technique is used on those RBs.

The beam-formed pilots are beam-formed with some antenna weights. The beam-formed pilots could be per-data-stream pilots meaning that the pilots and data are beam-formed in the same manner, as is the case in closed-loop SU-MIMO or MU-MIMO. Alternatively, the pilots could be per-beam pilots which means that the pilots are transmitted on a beam separately from the data transmission, as is the case in hybrid space-time or space-frequency block codes plus MIMO with beam-forming, or where data is open-loop space-time or space-frequency block coded/MIMO-encoded over two or more beams.

The first type of pilot usability is "broadcast" usability, which means that the pilots in the RB are usable by all mobile stations regardless of their assignment. In this case the pilot elements in the RB are available to all mobile stations. For broadcast pilots, the pilots are generally per-transmit-antenna pilots and if antenna virtualization is used the virtualization method must not change across a sub-frame or longer so as to avoid ruining link adaptation. Another type of pilot usability is "dedicated" usability, which means that the pilots are usable only by the set of mobile stations assigned to that RB. A set is typically only a single mobile station, but may be more than one mobile station in MU-MIMO. The term "dedicated" may also be called "per-allocation." An example of a dedicated pilot is a beam-formed pilot where the beam-form vector or matrix changes across RBs, as may be the case with uplink sounding based SU-MIMO or MU-MIMO. Another example of a dedicated pilot is a per-transmit-antenna pilot where the RB is transmitted with an antenna virtualization method that changes from RB to RB. A third example is also per-transmit-antenna pilots on a particular RB where other RBs in the same interval or sub-frame are not all broadcast.

The pilot usability is summarized in Table 1.

TABLE 1

| RB Pilot type/RB Pilot Usability | | Dedicated Pilots (per-allocation) | Broadcast Pilots (available to all) |
|---|---|---|---|
| Beam-formed pilots | Pilots and data are beam-formed together | Uplink sounding or analog feedback-based SU-MIMO/MU-MIMO where beam-forming strategy can change from one RB to another | Hybrid beam-forming plus MIMO/space-time or space-frequency block code where beam-forming strategy is identical for all RBs |
| | Pilots are beam-formed differently than the data | Hybrid beam-forming plus MIMO/space-time or space-frequency block code where beam-forming strategy can change from one RB to another | Hybrid beam-forming plus MIMO/space-time or space-frequency block code where beam-forming strategy is identical for all RBs |
| Per-transmit-antenna pilots (including antenna virtualization) | | Open-loop space-time or space-frequency block code/MIMO when not all RBs are per-transmit antenna pilots*, or when antenna virtualization strategy is different on other RBs | Codebook-based closed loop SU-MIMO or MU-MIMO, open-loop space-time or space-frequency block code/MIMO, or where all RBs are per-transmit-antenna and the antenna virtualization method is the same on all RBs |

In implementations, it is generally assumed that all RBs within a sub-frame have the same pilot usability. In other words, a sub-frame contains either all broadcast or all dedicated pilot RBs. All RBs with per-transmit-antenna pilots (and using identical virtualization if virtualization is used) are technically useable by all mobile stations, i.e., the pilots are broadcast pilots. However when dedicated control is used with a mix of RB pilot types, it will likely be impractical for a mobile station to know which RBs are usable, thereby rendering all RBs dedicated for all practical purposes.

In some implementations, an RB may be configured to contain two portions, a data portion or channel and a control portion or channel. The data portion transmits information to a user that is "assigned" to receive a downlink allocation on that RB. The control portion may consist of control information that is used to indicate various characteristics of the data portion of the RBs that are being used to make up a sub-channel, as discussed below.

The data and control portions of each RB may be separately classified according to which set of mobile stations can use the pilots in that RB for channel estimation purposes (pilot usability: dedicated/per-allocation or broadcast/available to all). The data and control portions of each RB may also be classified according to how the pilots are transmitted along with the non-pilot symbols (pilot type: beam-formed or per-transmit-antenna). Generally, the control portion of the RB can use pilots of a different type and usability than the pilots contained in the data portion of the RB. Therefore, the prior and subsequent discussions on RB pilot characteristics are applicable when the discussion is limited to the data portion of the RB only (in addition to being applicable when the discussion is concerning the entire RB). Similarly, the prior discussion on RB pilot characteristics is applicable when the discussion is limited to the control portion of the RB (in addition to being applicable when the discussion is concerning the entire RB).

Regarding Table 1, if the RB data portion uses broadcast pilots, the typical usage cases are open-loop transmission and codebook-based closed-loop transmission. For this example, the allowable pilot types are per-transmit-antenna and beam-formed pilots as long as the beam-forming strategy is the same for all RBs within a sub-frame (or longer to facilitate link adaptation). For the open-loop case with broadcast pilots in the data portion of the RB, the mobile station will need to be informed by the base station through control signaling of the number of transmit antennas which determines the pilot format and/or the specific transmit format which determines the exact transmission method (spatial rank, etc.), which will have to be determined/specified ahead of time. The system will need a list of the specific methods that are defined for the number of transmit antennas in use, because in practice the base station generally can transmit only in a manner that the mobile station can receive and decode. The number of antennas can also be detected blindly during cell search process.

For codebook-based closed-loop transmission with broadcast pilots in the data portion of the RB, the mobile station will need to be informed by the base station through control signaling of one or more of the number of transmit antennas where the pilot format in use is determined by the number of transmit antennas and/or the number of spatial streams (where the term spatial stream is also known as a transmission layer in spatial multiplexing MIMO communications). For SU-MIMO implementations, the mobile station will need to be informed of the modulation and coding rate on each stream along with the power and scaling on each stream which is necessary if it is desired to adapt the power and data rate on each stream. For MU-MIMO implementations, the mobile station will need to be informed of the modulation and coding rate on each mobile station's data stream along with an indication of which spatial stream is for which mobile station. The transmit weight vector or matrix in use on each RB which is useful for optional codebook feed forward (either confirmation or override) from the base to the mobile station, or in uplink sounding where the codebook is fed forward from the base station to the mobile station in TDD.

In implementations where the RB data portion uses dedicated pilots, the pilots are either beam-formed or are per-transmit-antenna. For the beam-formed pilots of this example, the pilots are either beam-formed with the data or are separate from the data. It is also possible to mix some of the RBs using per-transmit-antenna pilots with other RBs that use beam-formed pilots. The usage cases for this mixing of pilot types is for frequency multiplexing of open-loop transmission with uplink sounding or analog feedback based closed loop SU-MIMO or MU-MIMO. Any RB with per-transmit-antenna pilots (and using identical antenna virtualization if virtualization is used) are technically useable by all mobile stations, i.e., the pilots are broadcast. However when dedicated control is used with a mix of RB pilot types (beam-formed versus per-transmit-antenna), it will likely be impractical for a mobile station to know which RBs are usable, which renders the pilots in all the RBs dedicated (per-allocation usage) for all practical purposes.

When the RB data portion uses dedicated pilots, various multiple antenna modes may be supported such as closed-loop SU-MIMO or MU-MIMO (using uplink sounding (TDD), analog feedback (TDD and FDD) and DOA methods (TDD and FDD)), hybrid beam-forming plus MIMO/space-time or space-frequency block code where beam-forming strategy can change from one RB to another (using uplink sounding (TDD), analog feedback (TDD and FDD) and DOA methods (TDD and FDD)), and codebook feedback (TDD and FDD) with no feed forwarding of the codebook index. When the RB data portion contains dedicated pilots, the base station may need to signal the number of spatial streams which in turn determines the pilot format in the resource block so that the mobile station can detect its data symbols. For SU-MIMO, the base station also signals the modulation and coding rate for each data stream. For MU-MIMO, the base station signals the modulation and coding rate of each stream and optionally which stream to which the mobile station is assigned.

The information required by the mobile station is signaled with control channels. Generally, the control channel (or control portion of the RB) is simply data for one or more mobile stations and thus could be dedicated or broadcast in a manner similar to the data portion of the RB. The RB will have multiple pilots contained within it and these pilots will be associated either with the allocation control channel or channels, the data channel, or both. Some typical scenarios for the control and data pilot combinations are discussed below. In FIG. 5, the control and data portions of the RB both use broadcast pilots. "$A_c$" refers to the allocation channel, i.e., the control portion, which may be for one or more mobile stations. "$B_n$" refers to per-transmit antenna pilots for antenna "n", and "d" refers to data symbols, which may be for one or more mobile stations or for one or more data streams. In this case the control portion may use open-loop transmission, e.g., cyclic delay diversity, space-time or space-frequency block codes, or use a codebook transmission technique which would likely need blind detection of the codebook index. For this example, the data could also use an open-loop or codebook-based transmission strategy. For this combination, the mobile station may use all pilots across both frequency and time to determine channel estimates that may be used to decode the control and/or data portions. For this combination, the multiple pilot elements associated with the allocation control channel (which can be any of the pilots in the sub-frame containing the resource block or adjacent sub-frames) are broadcast pilot elements. Also, the multiple pilot elements associated with the resource block (e.g., for decoding the data channel), which may be any of the pilots in the sub-frame containing the resource block or adjacent sub-frames, are also broadcast pilot elements.

In FIG. 6, the control portion of a RB uses broadcast pilots and the data portion uses dedicated pilots. "$A_c$" refers to the allocation channel, i.e., the control portion, which may be for one or more mobile stations. "$B_a$" refers to broadcast pilots for the allocation channel. "$D_n$" refers to a dedicated pilot for stream "n", and "d" refers to data symbols, which may be for one or more mobile stations or for one or more data streams. In this case the control transmission method would likely be open-loop but would not use codebook beam-forming. If the codebook beam-forming is available for control it should be available for the data. The data transmission could use either non-codebook closed-loop methods or open-loop methods where different RBs in a sub-frame can use different methods. For this combination, the mobile station can use all broadcast pilots for the allocation channel to obtain channel estimates that are used to decode the allocation channel, but cannot use the dedicated pilots for the data streams to help decode the allocation channel. Additionally, the mobile station can only use the dedicated pilots in the data portion of that particular RB to obtain channel estimates that are used to detect the data. For this combination, the multiple pilot elements associated with the allocation control channel (which are only the pilot elements contained in the allocation channel portion) are broadcast pilot elements. In this example, all broadcast pilot elements for all allocation channels across frequency (whether they are for the mobile station or a different mobile station) can be used to decode the allocation control channel. In some cases, that broadcast pilot elements from previous and/or future allocation channels could also be used to help decode the current allocation channel, but none of the pilots on the dedicated data portion can be used. Also, for this combination, the multiple pilot elements associated with the resource block (e.g., for decoding the data channel), which are only the pilot elements contained in the resource block, are dedicated pilot elements. The common pilots can also be boosted and the boost indicated using the CIC channel.

In FIG. 7, the control and data portions of the RB both use dedicated pilots. "$A_c$" refers to the allocation channel, i.e., the control portion, which may be for one or more mobile stations. "$D_a$" refers to dedicated pilots for the allocation channel. "$D_n$" refers to a dedicated pilot for stream "n", and "d" refers to data symbols, which may be for one or more mobile stations or one or more data streams. The control transmission in this case could be beam-formed in any manner and would also have the ability to power boost relative to other control elements, i.e., to boost a far mobile station's control information relative to a near mobile station's control information. The data transmission may use either non-codebook closed-loop methods or open-loop methods where different RBs in a sub-frame can use different methods. For this combination the mobile station can usually use only use the dedicated pilots for the allocation channel within the RB to obtain channel estimates that are used to decode the allocation channel within the same RB. An exception to this rule is if the allocation channel for the same mobile station is contained in multiple adjacent RBs which are all beam-formed in a similar manner. Note that the mobile station typically cannot use the dedicated pilots for the data streams to help decode the allocation channel. An exception to this rule would be if the control and data portions were both for the same mobile station and both portions were beam-formed in an identical manner. Additionally, the mobile station can only use the dedicated pilots in the data portion of that particular RB to obtain channel estimates that are used to detect the data. For this combination, the multiple pilot elements associated with the allocation control channel (which are only the pilot elements within an allocation control channel tile, e.g., the 9×1 tile shown as a dark rectangle) are dedicated pilot elements. Thus a mobile station can only use the single pilot element in a tile to decode the portion of the allocation control in that tile. If multiple tiles, for a single user, adjacent in time and/or frequency are all transmitted in a similar manner (e.g., all use the same beam-former), then the multiple pilot elements from all of these tiles could be used to decode the allocation channel on those groups of tiles. Also, for this combination, the multiple pilot elements associated with the resource block (e.g., for decoding the data channel), which are only the pilot elements contained in the resource block, are dedicated pilot elements.

According to another combination, the control portion of the RB uses dedicated pilots and the data portion uses broadcast pilots. However this case is not as desirable as the others since in some cases it would be preferable to use broadcast pilots for both the control and data portions.

Generally, each of the multiple time-frequency tiles of the allocation control channel comprise multiple sub-carriers and at least one pilot element. In some implementations, some or all of the multiple time-frequency tiles in a resource block comprise the same number of sub-carriers and the same number of pilot elements. In some embodiments where the pilot element of each tile is a dedicated pilot element, the dedicated pilot element is functionally associated only with the multiple sub-carriers of the tile of which the dedicated pilot element is a part. In some embodiments, the frequency dimension of the time-frequency resource block is an integer multiple of the frequency dimension of the time-frequency tile. And in another embodiment, the time dimension of the time-frequency resource block is an integer multiple of the time dimension of the time-frequency tile. In FIGS. 5-7, each of the multiple time-frequency tiles has a rectangular shape with the same number of sub-carriers and the same number of pilot elements. More generally, the tiles may have non-rectangular shapes.

The allocation control channel generally contains at least one resource allocation message, which may comprise one or more time-frequency tiles. In embodiments where the message comprises multiple tiles, each of the multiple time-frequency tiles comprises the same number of subcarriers and the same number of pilot elements. Also, each of the multiple time-frequency tiles constituting the resource allocation message may be distributed along a frequency dimension of the time-frequency resource region, wherein at least some of the multiple time-frequency tiles constituting the resource allocation message are interleaved with time-frequency tiles that do not constitute the resource allocation message, thus providing frequency diversity. FIG. 3b illustrates the allocation control channel provided within a first in time sub-frame adjacent to a second in time sub-frame that is devoid of an allocation control channel, wherein the first and second sub-frames are located within the time-frequency resource region and the first in time sub-frame also includes a data channel.

Figure 8:
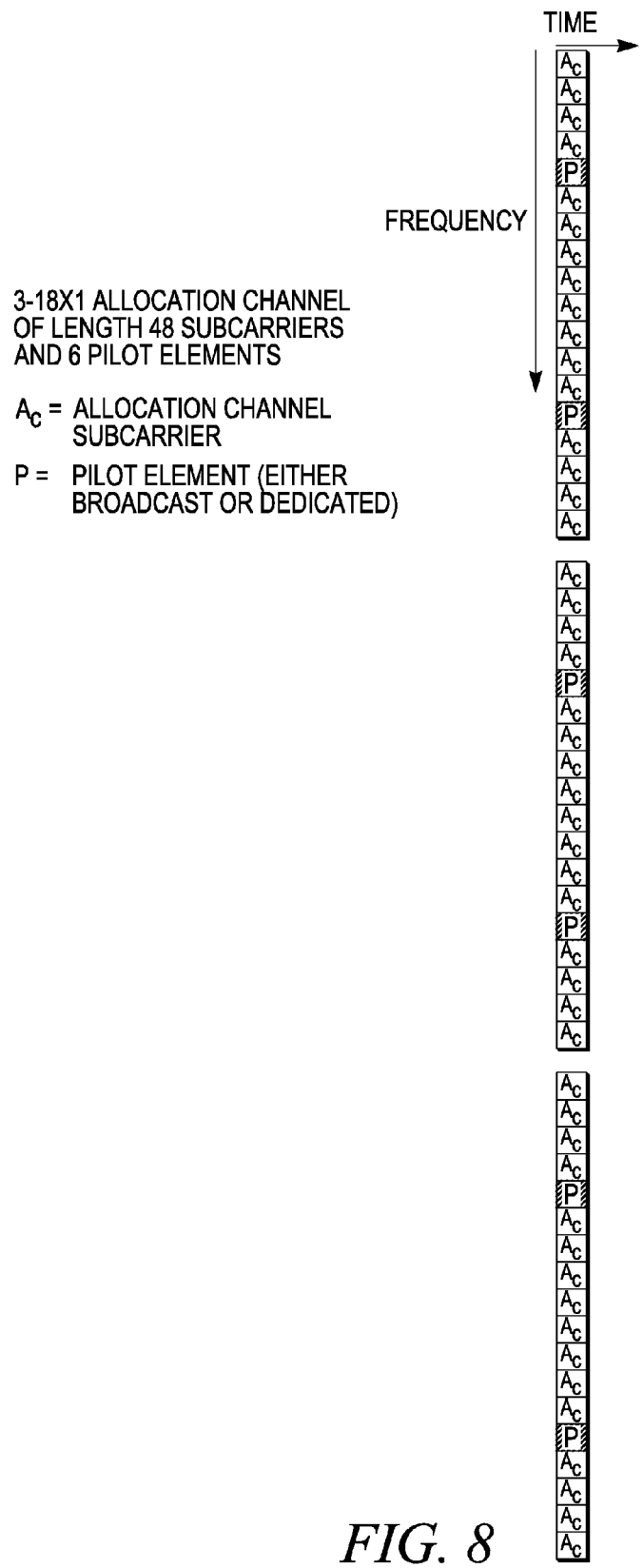
FIG. 8 illustrates of an allocation channel having three 18×1 rectangular tiles containing allocation channel sub-carriers and pilots.
Figure 9:
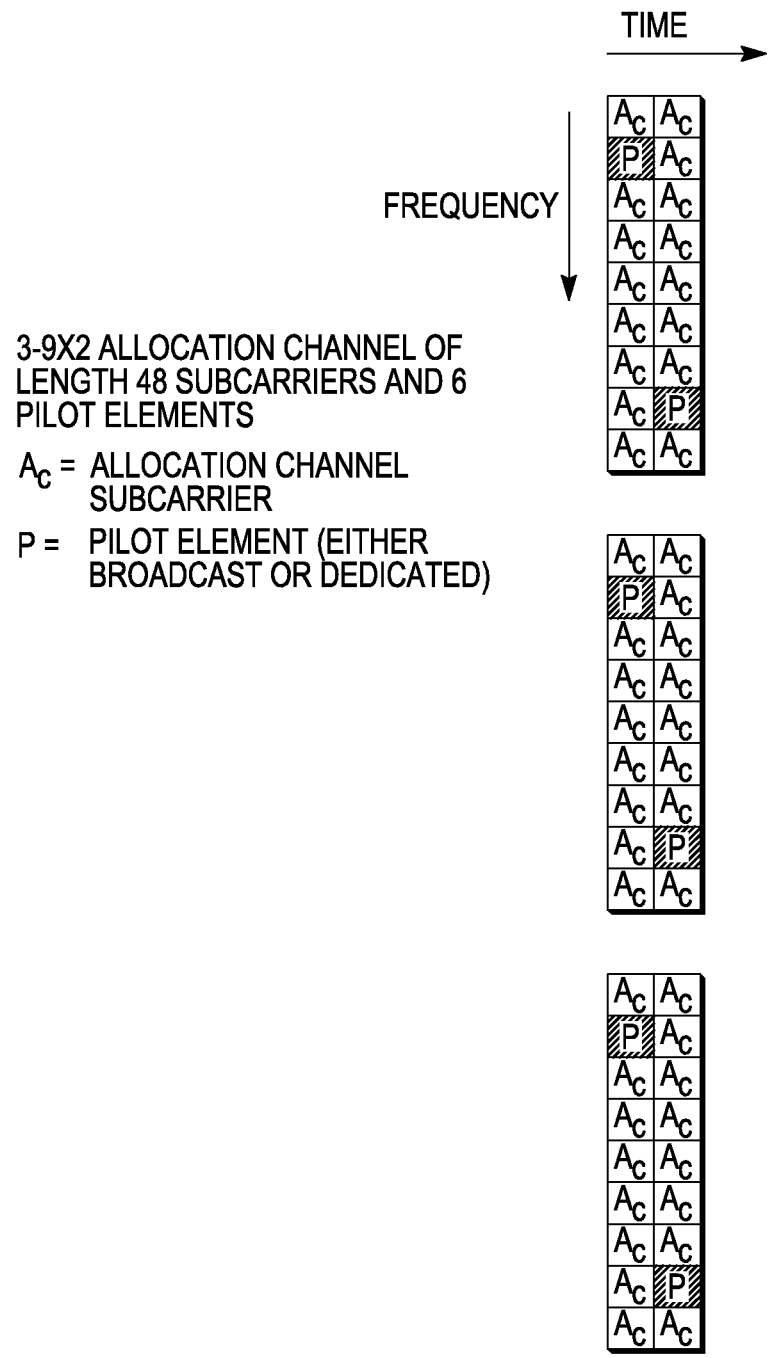
FIG. 9 illustrates an allocation channel having three 9×2 rectangular tiles containing allocation channel sub-carriers and pilot elements.
Figure 10:
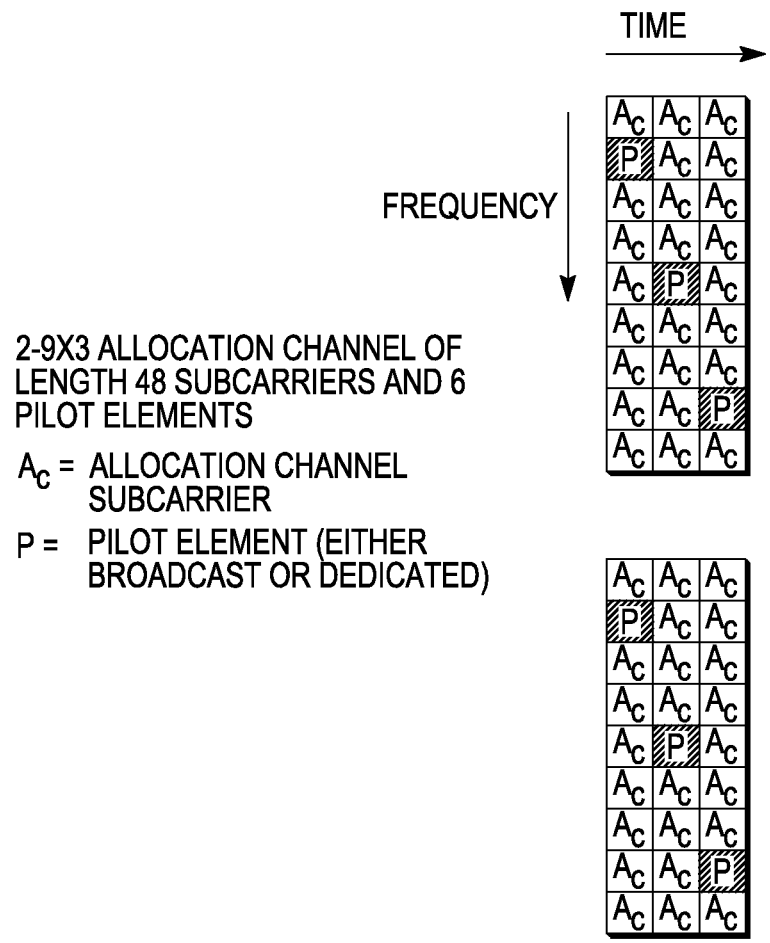
FIG. 10 illustrates an allocation channel having two 9×3 rectangular tiles containing allocation channel sub-carriers and pilots.

In FIGS. 5-7, each of the multiple time-frequency tiles comprise the same number of sub-carriers and the same number of pilot elements. Note also that FIGS. 5-7 show only a portion of the allocation control channel. FIGS. 8-10 show complete allocation channels to one mobile station for allocation channels of size 48 sub-carriers with six total pilot elements. Each example has m groups (i.e., time-frequency tiles) of "n times p" (n×p) sub-carriers containing both allocation channel sub-carriers ($A_c$ and pilot elements (P) which may be broadcast or dedicated. The gap in the frequency direction indicates that the groups of n×p symbols are separated in frequency by some distance (e.g., a third of the bandwidth). In these examples the entire allocation shown is meant for one user, but there will typically be allocation channels for multiple users. These multiple allocation channels will usually need to fit within the resource block definition (e.g., the 18×6 resource blocks as shown in FIGS. 5-7). FIG. 10 illustrates 2-9×3 allocation channels. In FIG. 11, four 2-9×3 allocation channels for four different users are placed within two 18×6 resource blocks separated in frequency wherein the gap in the frequency direction indicates a separation in frequency. In this case the frequency dimension of the resource block (i.e., time-frequency resource block) is an integer multiple (2) of the frequency dimension of the 9×3 group (time-frequency tile). Also, the time dimension of the resource block is an integer multiple (2) of the time dimension of the 9×3 group (time-frequency tile).

For the mobile station to be able to demodulate and detect its data from a downlink transmission on a sub-channel, one or more of the following information may be required: the antenna array transmission technique used which may also include the number of transmit (or virtual) antennas; the transmission rank which may be the number of spatial streams in SU-MIMO or the number of simultaneous users in MU-MIMO; Pre-coded Matrix Index (PMI) for SU-MIMO or MU-MIMO transmission since the base-station may or may not use the PMI reported by the MS; Redundancy Value (RV) parameters for HARQ transmission; the modulation and coding rate for each stream which might be different on each stream; the pilot type on the RBs (either broadcast which means the pilots are available to all mobile stations or dedicated which means the pilots are available only to the mobile station(s) assigned to a particular RB); pilot layout which is typically tailored to the number of spatial streams or number of transmit or virtual antennas; and/or the control and data allocations within the sub-frame.

Figure 3A:
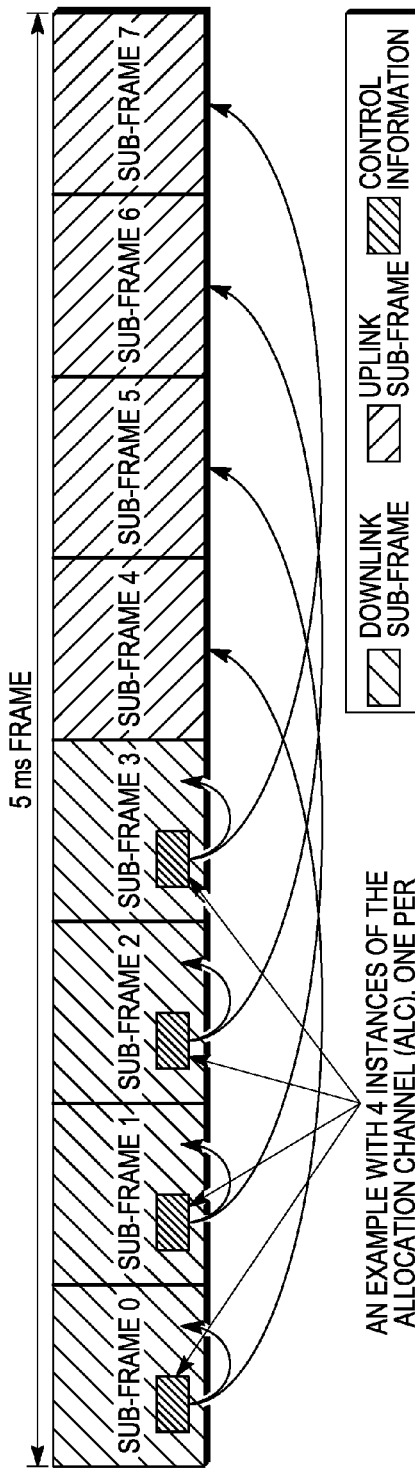
FIG. 3 illustrates various frame structures showing the placement and domain of an Allocation Control (ALC) Channel.
Figure 3B:
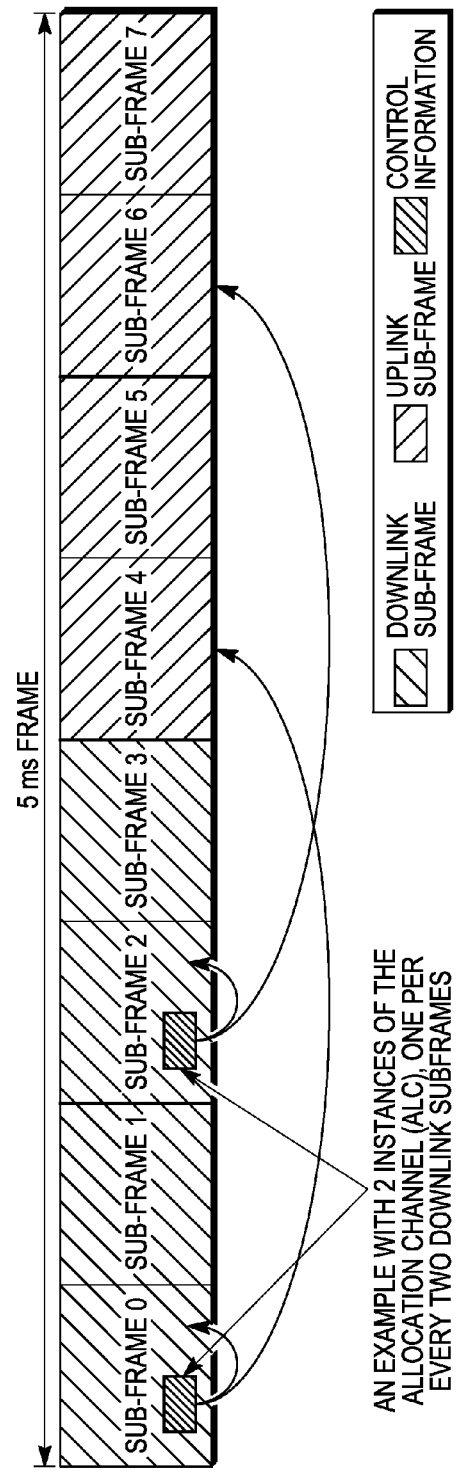

FIG. 3 illustrates an allocation control (ALC) channel for allocating resources to individual mobile stations within the system on an individual sub-frame or group of sub-frames. The allocated resources can either be a map of downlink RBs containing a PHY PDU or a grant of uplink RBs for the transmission of a PHY PDU. The ALC is often encoded such that it comprises multiple dedicated control messages each encoded separately and intended for a specific mobile station. Each occurrence of the ALC assigns resources for one or more specific sub-frames for either downlink transmissions or uplink transmissions. In WiMAX, the downlink (DL) maps perform functionality similar to the ALC. In 3GPP UMTS LTE, the Physical Downlink Control Channel (PDCCH) performs functionality similar to the ALC.

In one embodiment, the ALC indicates a characteristic of the multiple pilots elements associated with the resource block. The ALC may also indicate a number of spatial streams transmitted on the resource block. In another embodiment, the allocation control channel provides information for indicating which sub-carriers associated with the resource block are pilot elements based on a channel metric, wherein the channel metric is selected from a group comprising: a velocity metric; data rate; and delay spread. In a more particular embodiment, the allocation control channel provides information for indicating which sub-carriers associated with the resource block are pilot elements based on a velocity metric. The allocation control channel may also indicate a number of spatial streams transmitted on the resource block.

In some implementations, the base station transmits a set of pilot sequences on multiple pilot elements, and the allocation control channel indicates which pilot sequences of the set of pilot sequences are assigned to a particular user. The ALC may be used to indicate a number of spatial streams transmitted on the resource block and which of the spatial streams on which a particular user, for example, an SDMA user, is allocated to receive data.

The CIC will need to be broadcast to the edge of the cell as it must be decoded by all mobile stations seeking service within the cell. The structure of the CIC is generally the same for all deployment environments, e.g., rural, suburban, urban or indoor, so that new mobile stations roaming into the area may decode and learn the system configuration. The CIC defines the coverage area of the cell and must therefore be robust in order to accommodate the largest cell sizes. To reduce overhead and improve efficiency, the contents of each CIC message must be minimized since a high coding rate may be required to achieve the desired coverage reliability anywhere from $1/8$ to $1/40$. One way to improve reliability and achieve the desired coverage is through repetition coding in combination with conventional Forward Error Correction codes such Convolutional, Block or Turbo codes. Repetition coding of the CIC message may be employed within the super-frame and across multiple super-frames. For the latter case, the CIC message must be kept constant across multiple super-frames in order to allow the mobile station to accumulate and combine multiple instants of a super-frame control message. Therefore information that changes often such as allocations, access grants and frame counters must be excluded. The contents of the super-frame control must be identical so that an error detection code such as Cyclic Redundancy Check (CRC) is constant from frame to frame. Combining several, two to four, CIC message transmissions can greatly improve reliability. Combining even larger numbers, e.g., five to twelve, of CIC message transmissions will allow support for larger size cells, up to 100 km. Finally, the efficiency of the CIC transmission can be improved by reducing the number of occurrences relative to the per sub-frame control, for example, an allocation control (ALC) channel. Multiple ALC channel transmissions occur for every CIC transmission. For example, the ALC channel is transmitted every sub-frame on the order of every 0.6 ms while the CIC is transmitted every 20 ms. In one embodiment, as many 32 ALC transmissions may occur for a single CIC.

The CIC message may indicate the number of physical transmit antennas and characteristics of the data portion of the RBs, including the number of virtual transmit antennas that equal the number of physical antennas if antenna aggregation is not used. The CIC message may also indicate that the number of virtual antennas is less than the number of physical antennas if antenna aggregation is used. The CIC message may indicate the maximum number of spatial streams supported by the base station. The CIC message may indicate a CL MIMO enabler supported by the base which may be a bitmap that indicates which modes are supported. This CL MIMO enabler might be required for uplink feedback control structures which may vary depending on the CL MIMO enabler. For example, if the pilot type is dedicated, then the uplink feedback mechanism may be uplink channel sounding, or analog feedback, or codebook feedback. On the other hand, if the pilot type is broadcast on the data portion, then either no feedback mechanism is needed for open loop techniques or codebook feedback is used.

The CIC message may indicate characteristics of the pilot portion of the sub-frames such as the pilot usability for the allocation control portion of the sub-frames, e.g., whether the control pilots are dedicated or broadcast. The CIC message may indicate the location of the pilot elements associated with the ALC, and the pilot usability of the data portion (i.e., whether the pilots are broadcast or dedicated for the RBs). If the pilot usability is broadcast usability, then the pilot format is determined by the number of transmit antennas. Alternatively, if the pilot usability is dedicated usability, then the pilot format is determined by number of spatial streams transmitted in the sub-channel (as indicated by the ALC). The CIC message may indicate the transmission method used to support the ALC. For example, if the pilot type used to support the ALC decoding is broadcast, then the transmission method could be either cyclic delay diversity, generalized cyclic delay diversity, a space-frequency or space-time block code, or beam-forming with codebook-type pre-coding. On the other hand, if the pilot type used to support the ALC decoding is dedicated, then the transmission method could be either beam-forming where weights are computed based on the uplink traffic or beam-forming based on a feedback mechanism, e.g., codebook feedback, uplink channel sounding, or analog feedback. The CIC message may also identify the pilot elements associated with the allocation control channel.

Figure 4:
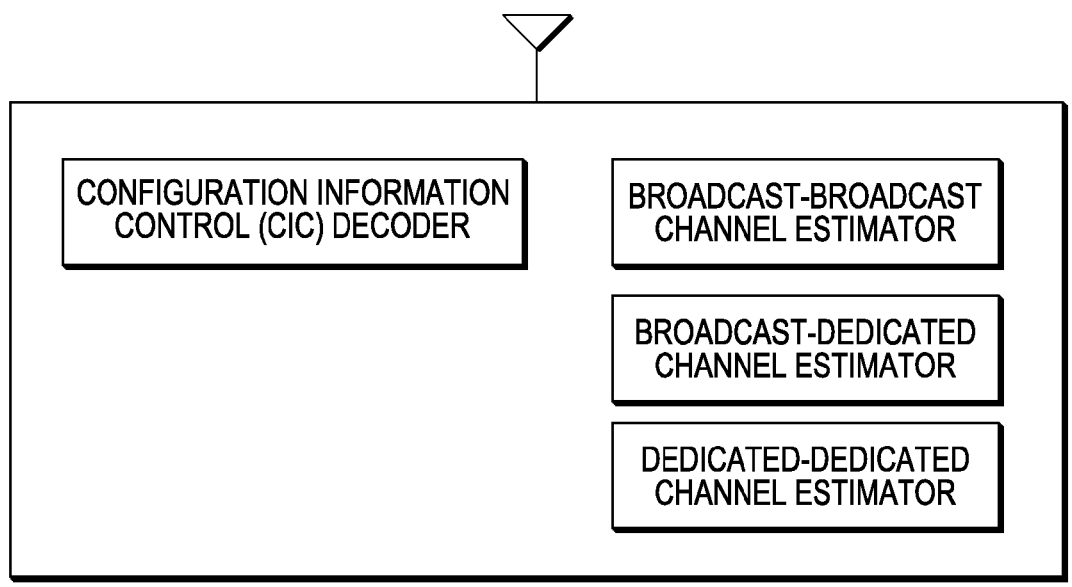
FIG. 4 illustrates a mobile station having a CIC decoder entity and a plurality of sub-frame ALC estimators.

In one embodiment, the CIC communicates to the mobile station characteristics of the multiple pilots associated with the control channel, for example, the allocation control channel. For example, the CIC may indicate whether the pilots associated with the ALC are usable by all mobile stations or whether a mobile station can only use pilots associated with the individual ALC messages intended for it. In FIG. 4, the mobile station includes a controller configured to decode the information provided by the CIC. The information provided by the CIC as discussed herein is only exemplary and not intended to be limiting. Moreover, not all of the exemplary information will be provided in all implementations.

When the ALC is to be transmitted with broadcast pilot usability, it is anticipated that the system will support at least one specific antenna array transmission method for transmitting the ALC where the choice of antenna array transmission methods includes methods that require or operate with broadcast or per-transmit-antenna pilots (e.g., low delay Cyclic Delay Diversity (CDD), Space-time block coding (STBC), Space Frequency block coding (SFBC), ALC pre-coding etc.). An indicator in the CIC will indicate which specific antenna array transmission method is used for transmitting the ALC. In this case, the system may be designed so that the specific transmission method used will indirectly indicate the specific pilot and information format to support the ALC.

Similarly, when the ALC is to be transmitted with dedicated pilot usability, it is also anticipated that the system will support at least one specific antenna array transmission method for transmitting the ALC, where the choice of antenna array transmission methods includes methods that require or operate with dedicated or beam-formed pilots. For an ALC that is to be transmitted with dedicated pilot usability, a preferred method is beam-forming. If more than one method is supported in this case, then an indicator in the CIC will indicate which antenna array transmission method is being used to transmit the dedicated control carried on the ALC. In this case, the system may be designed so that the specific transmission method used will indirectly indicate the specific pilot and information format for the ALC.

Another aspect of the hierarchical control structure is where the CIC also specifies the pilot usability of the data portion of the RBs in the sub-frame. As discussed, it is anticipated, but not required, that the RBs in the sub-frame will all either be transmitted with broadcast usability or dedicated usability. The hierarchical control structure is designed so that two classes of pilot formats will be available for use in the data portion of the RB, the broadcast pilot class is intended for use when the pilot usability of the data portion of the RB is set to broadcast, and the dedicated pilot class is intended for use when the pilot usability of the data portion is set to dedicated.

Within each pilot format class, there are several pilot formats that will be available for use on the data portion of the RB, where the pilot formats within each class differ from each other according to various characteristics. For example the broadcast class of pilot formats may contain several pilot formats where each pilot format is tailored to support a specific number of transmit antennas. Similarly, the dedicated class of pilot formats may contain several pilot formats where each pilot format is tailored to support a specific number of spatial streams (for supporting beam-forming, closed-loop SU-MIMO or closed-loop MU-MIMO or open-loop spatial multiplexing using large delay CDD).

The broadcast or dedicated class of pilot formats may also contain additional pilot formats that are tailored to support different mobile station velocities along with a specific number of transmit antennas (for the broadcast class) or spatial streams (for the dedicated class). A pilot format that is tailored for higher velocity users may contain a denser pilot layout to enable better time-tracking of the channel response within the RB. In contrast, a pilot format that is tailored for lower velocity users may contain a sparser pilot layout to enable a more efficient pilot structure where time-tracking of the channel response within the RB is not critical. The base station can then use one of the pilot formats within the class that has been optimized for users based on velocity feedback provided by the mobile station. The benefit of this strategy is that higher velocity users can be provided a denser pilot structure to enable better time tracking, while lower speed users can be provided with a more efficient pilot structure. In a similar fashion, the broadcast or dedicated class of pilot formats may also contain additional pilot formats that are tailored to support different mobile station delay spreads. A pilot format that is tailored for higher delay spread users may contain a denser pilot layout in frequency to enable better frequency-tracking of the channel response within the RB. In contrast, a pilot format that is tailored for lower delay spread users may contain a sparser pilot layout to enable a more efficient pilot structure where frequency-tracking of the channel response within the RB is not critical. If the mobile station feeds back an estimate of its delay spread to the BS, the BS can then use one of the pilot formats within the class that has been optimized for users with that velocity. The benefit of this strategy is that higher delay spread users can be provided a denser pilot structure to enable better frequency tracking, while lower speed users can be provided with a more efficient pilot structure.

The broadcast or dedicated class of pilot formats may also contain additional pilot formats that are tailored to more optimally support different modulation and coding schemes. For example, when QPSK is transmitted, the channel estimation accuracy requirements are less than when 64QAM is transmitted, which implies that the pilot density for time-frequency channel tracking needs to be greater for 64QAM than for QPSK, where density is used to loosely indicate the number of pilots allocated per unit of frequency and/or unit of time. If the base station is planning on transmitting QPSK to a mobile station, it can transmit a pilot format that is less dense than that required for a 64QAM mobile station. The benefit of this technique is to provide a more efficient pilot format when conditions permit.

In the hierarchical control structure of this disclosure, the CIC indicates the data portion pilot usability, which directly determines which pilot format class is available for use on the data portion of the RBs. Meanwhile, the ALC informs the mobile station of which pilot format within the selected pilot format class is selected to transmit data (i.e., a PHY PDU) to the mobile station on the RBs. With knowledge of the pilot usability and the antenna array transmission method used by the control portion of the RB, the mobile station can then decode the ALC that resides in the control portion of the RB. The pilot usability of the data portion of the RB determines which class of pilot format is being used for the data portion of the RB, and the ALC indicates which pilot format within the selected pilot format class is to be used on the data portion of the RB.

As discussed, RBs may be grouped according to a narrowband allocation method or according to a diversity allocation method. When the entire sub-frame is using one allocation method or the other, the super-frame control will indicate which allocation method is used to group RBs into a sub-channel for transmitting a PHY PDU. On the other hand, when the diversity allocation method and the narrowband allocation method are used at the same time within a sub-frame, then the ALC will indicate which allocation method is being used for a particular PHY PDU being transmitted.

In general, the CIC will describe the usability of the multiple pilots in a time-frequency (TF) resource region including the ALC and resource blocks. The TF resource region containing a resource block indicating in the CIC that all of the multiple pilot elements associated with the resource block are dedicated pilot elements. Alternatively, the TF resource region containing a resource block, indicating in the CIC that all of the multiple pilot elements of the TF resource region are dedicated pilot elements.

In one embodiment, the CIC communicates an indication of one of the following combinations for control and data pilot structures: Broadcast-Broadcast (BB) combination where the control uses broadcast pilots and the data portion also uses broadcast pilots; Broadcast-Dedicated (BD) combination where the control uses broadcast pilots and the data portion used dedicated pilots; Dedicated-Dedicated (DD) combination where the control uses dedicated pilots and the data portion uses dedicated pilots; Dedicated-Broadcast (DB) combination (optional or less preferred) where the control uses dedicated pilots and the data portion uses broadcast pilots. Although the latter option is possible, it may not be as desirable as the first three options because there is likely no advantage to beam-form the control without beam-forming the data or to transmit the control in such a way that prohibits use of the broadcast pilots of the data portion to decode the control channel. However, despite this reasoning, other factors may favor the latter configuration.

The pilot usability information could be communicated with only 2 bits of information allowing for an efficient and reliable CIC transmission. Techniques such as Forward Error Correction coding in combination with repetition coding could be employed to achieve high reliability for low signal-to-noise or signal-to-interference conditions. A mobile station receiving this CIC message would know which channel estimation technique to employ so that it could decode the ALC contained within the sub-frame and subsequently decode the allocations destined for that mobile station or transmit uplink resources allocated to that mobile station.

A mobile station receiving the indication of the BB format in a CIC would have knowledge of the pilot formats for the downlink sub-frame and use a channel estimation algorithm based on that knowledge to decode the ALC. In this case, the mobile station can use all the pilots allocated in both the control and data portion of the sub-frame for channel estimation. A mobile station receiving the indication of the BD or DD format in the CIC would have knowledge of the pilot formats in the downlink sub-frame associated with the ALC and therefore could select the appropriate channel estimator. Because the pilots for the data portion of the sub-frame are dedicated, the mobile station may require more information to decode the data portion as the pilot format in the data portion may be adjusted on per allocation basis.

As suggested the mobile station also requires resource allocation control. The format of the allocation control channel (ALC) will depend on the pilot type (e.g., dedicated or broadcast) for the RBs signaled in the CIC. When dedicated pilots for the RBs are signaled in the CIC, the ALC sent by the base station may indicate one or more of the following: the number of data streams which would then implicitly determine the pilot format of the resource block; the modulation and coding rate of each stream if the transmission to the mobile station is to be SU-MIMO; and/or which stream or streams to which the mobile station is assigned and the modulation and coding rate for one or more of the streams if the transmission type from the base is MU-MIMO.

When broadcast pilots for the RBs are signaled in the CIC and the transmission type is open-loop, the ALC sent by the base station may indicate the specific scheme being used. The number of virtual antennas signaled in the CIC would specify the candidate list of open loop schemes. Also, each potential candidate scheme has an associated transmission rank (number of spatial streams). When broadcast pilots for the RBs were signaled in the CIC and the transmission type is closed-loop (typically codebook-based feedback), the ALC sent by the base station may indicate one or more of the following: the number of spatial streams; and or the Tx weight vector or matrix used on each RB known as pre-coding matrix indicator (PMI).

When broadcast pilots for the RBs are signaled in the CIC and the transmission type is SU-MIMO (either open or closed loop), the ALC sent by the base may indicate one or more of the following in addition to the above information: the modulation and coding rate used on each data stream and/or the power scaling on each data stream. When broadcast pilots for the RBs are signaled in the CIC and the transmission type is MU-MIMO (either open or closed loop), the ALC sent by the base may indicate one or more of the following in addition to the above information: the modulation and coding rate used on each data stream and/or the particular spatial stream assigned to each mobile station.

The RB for a particular mobile station may contain ALC information for that particular mobile station. This type of control information is one form of dedicated control since it is destined for one particular mobile station and does not need to be known to other mobile stations. In this case, one or two symbols within the RB may be allocated for control information instead of regular data.

On the downlink, the mobile station will receive and detect all of the control starting with the CIC contained in the super-frame which contains, amongst other things, an indication as to whether the ALC contained in the sub-frame uses dedicated pilots or broadcast pilots. If the ALC uses broadcast pilots, the RBs always use broadcast pilots. If the ALC uses dedicated pilots, the following items apply in a preferred embodiment: RBs always use dedicated pilots; the pilot format of the data portion of the RB is determined on a per allocation basis where the number of streams allocated determines the pilot format of the RB. There may also be an indication as to whether the transmission is SU-MIMO or MU-MIMO on that RB along with which stream is allocated to which mobile station in the case of MU-MIMO. It may also be desirable to change the pilot format based on the modulation type (e.g., 64-QAM will have a higher pilot density than QPSK) or velocity (e.g., higher speeds means a higher pilot density in time). The BS may adapt the pilot format for the RB based on an estimate of the velocity at which the mobile station is using. The data format of the RB is determined on a per-allocation basis including the modulation and coding rate per stream, possibly the power allocation on each stream, which could be based on pilot power for that stream, and the single codeword.

Generally, the format and content of the ALC depends on pilot usability. Therefore the CIC may implicitly determine the content and therefore the format of the ALC allowing the ALC format to be dynamically configured. For example, if pilot usability is broadcast for the resource block, then additional information may need to be signaled by the ALC such as a codebook index. Therefore when broadcast pilot usability is indicated in the CIC for resource blocks, the mobile station will assume that the codebook index is included for MU-MIMO transmissions. However, if dedicated pilot usability is indicated in the CIC for resource blocks then the mobile station will assume that the codebook index is not included. Another example is if pilot usability is dedicated, then the ALC may need to signal the stream the mobile is using in MU-MIMO. Therefore when dedicated pilot usability is indicated in the CIC for the resource blocks, the mobile station will assume that stream field information is included for MU-MIMO assignment. However, if broadcast usability for resource blocks is signaled in the CIC, then the mobile station will assume that the stream field is not included in the ALC.

A system supporting multiple environments, for example, rural, suburban, urban and indoor, may include other enhancements to address the particular needs of a mobile station roaming into the system. The system may have different antenna configurations for control and data (2 virtual antennas for control and 4 antennas for data) that would be effectively a broadcast-broadcast mode. In this case, the pilots could not be shared by control and data channels because of a different way the antenna array is utilized. The concept of the CIC can address the issue of extending CP for larger cells or MBS service. The pilot structures need to be different from normal CP sub-frames to keep the overhead at a manageable level. Also, pilots from multiple base stations should occupy the same sub-carriers during MBS transmission.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

The invention claimed is:

1. A wireless network infrastructure entity comprising:
a transmitter;
a controller coupled to the transmitter,
the controller configured to cause the transmitter to transmit a time-frequency resource region containing an allocation control channel and multiple pilot elements,
the allocation control channel includes multiple time-frequency tiles,
each time-frequency tile comprises multiple subcarriers and at least one of the multiple pilot elements,
the at least one pilot element of each time frequency tile is a dedicated pilot element, wherein the dedicated pilot element is functionally associated only with the multiple subcarriers of the time-frequency tile of which the dedicated pilot element is a part.

2. The entity of claim 1, the allocation control channel containing at least one resource allocation message constituted by multiple time-frequency tiles.

3. The entity of claim 2, each of the multiple time-frequency tiles comprises the same number of subcarriers and the same number of pilot elements.

4. The entity of claim 2, the controller configured to distribute each of the multiple time-frequency tiles constituting the resource allocation message along a frequency dimension of the time-frequency resource region, wherein at least some of the multiple time-frequency tiles constituting the resource allocation message are interleaved with time-frequency tiles that do not constitute the resource allocation message.

5. The entity of claim 1, each of the multiple time-frequency tiles has a rectangular shape with the same number of subcarriers and the same number of pilot elements.

6. The entity of claim 5, the time-frequency resource region containing a time-frequency resource block, the frequency dimension of the time-frequency resource block is an integer multiple of the frequency dimension of the time-frequency tile.

7. The entity of claim 5, the time-frequency resource region containing a time-frequency resource block, the time dimension of the time-frequency resource block is an integer multiple of the time dimension of the time-frequency tile.

8. The entity of claim 1, the controller configured to provide the allocation control channel within a first in time sub-frame adjacent to a second in time sub-frame that is devoid of a control channel, the first and second sub-frames are located within the time-frequency resource region.

9. The entity of claim 8, wherein the first in time sub-frame includes a data channel.

10. A method in a wireless network infrastructure entity, the method comprising:
transmitting a time-frequency resource region containing an allocation control channel and multiple pilot elements,
the allocation control channel includes multiple time-frequency tiles,
each time-frequency tile comprises multiple subcarriers and at least one of the multiple pilot elements,
the at least one pilot element of each time-frequency tile is a dedicated pilot element, wherein the dedicated pilot element is functionally associated only with the multiple subcarriers of the time-frequency tile of which the dedicated pilot element is a part.

11. The method of claim 10, the allocation control channel containing at least one resource allocation message constituted by multiple time-frequency tiles.

12. The method of claim 11, each of the multiple time-frequency tiles comprises the same number of subcarriers and the same number of pilot elements.

13. The method of claim 11, distributing each of the multiple time-frequency tiles constituting the resource allocation message along a frequency dimension of the time-frequency resource region, wherein at least some of the multiple time-frequency tiles constituting the resource allocation message are interleaved with time-frequency tiles that do not constitute the resource allocation message.

14. The method of claim 10, each of the multiple time-frequency tiles has a rectangular shape with the same number of subcarriers and the same number of pilot elements.

15. The method of claim 14, the time-frequency resource region containing a time-frequency resource block, the frequency dimension of the time-frequency resource block is an integer multiple of the frequency dimension of the time-frequency tile.

16. The method of claim 14, the time-frequency resource region containing a time-frequency resource block, the time dimension of the time-frequency resource block is an integer multiple of the time dimension of the time-frequency tile.

17. The method of claim 10, providing the allocation control channel within a first in time sub-frame adjacent to a second in time sub-frame that is devoid of a control channel, the first and second sub-frames are located within the time-frequency resource region.

18. The method of claim 17, wherein the first in time sub-frame includes a data channel.

19. A wireless network infrastructure entity comprising:
a transceiver;
a controller coupled to the transceiver,
the controller configured to cause the transceiver to transmit a time-frequency resource region containing a control channel, a resource block and multiple pilot elements,
the resource block having multiple sub-carriers;
the time-frequency resource region including information indicating which sub-carriers associated with the resource block are pilot elements based on a channel metric.

20. The entity of claim 19, wherein the channel metric is a velocity metric, providing information for indicating which sub-carriers associated with the resource block are pilot elements based on the velocity metric.

21. The entity of claim 19, the controller configured to indicate, in the allocation control channel, a number of spatial streams transmitted on the resource block.

22. The entity of claim 19,
the controller configured to cause the transceiver to transmit a set of pilot sequences on the multiple pilot elements, and
the controller configured to indicate, in the control channel, which pilot sequences of the set of pilot sequences are assigned to a particular user.

23. The entity of claim 19, providing the information for indicating which sub-carriers associated with the resource block are pilot elements based on a channel metric selected from a group comprising a velocity metric, data rate, delay spread.

24. A method in a wireless network infrastructure entity, the method comprising:
transmitting a time-frequency resource region containing a control channel, a resource block and multiple pilot elements,
the resource block having multiple sub-carriers;
providing information for indicating which sub-carriers associated with the resource block are pilot elements based on a channel metric.

25. The method of claim 24, wherein the channel metric is a velocity metric, providing information for indicating which sub-carriers associated with the resource block are pilot elements based on the velocity metric.

26. The method of claim 24, indicating, in the allocation control channel, a number of spatial streams transmitted on the resource block.

27. The method of claim 24,
transmitting a set of pilot sequences on the multiple pilot elements,
indicating, in the control channel, which pilot sequences of the set of pilot sequences are assigned to a particular user.

28. The method of claim 24, providing the information for indicating which sub-carriers associated with the resource block are pilot elements based on a channel metric selected from a group comprising a velocity metric, data rate, delay spread.

* * * * *